(12) United States Patent
Smith

(10) Patent No.: US 11,640,301 B2
(45) Date of Patent: May 2, 2023

(54) DUPLICATE DETECTION FOR REGISTER RENAMING

(71) Applicant: SiFive, Inc., San Mateo, CA (US)

(72) Inventor: Joshua Smith, San Francisco, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 17/712,221

(22) Filed: Apr. 4, 2022

(65) Prior Publication Data
US 2022/0253316 A1 Aug. 11, 2022

Related U.S. Application Data

(63) Continuation of application No. 16/851,941, filed on Apr. 17, 2020, now Pat. No. 11,294,683.

(60) Provisional application No. 63/002,313, filed on Mar. 30, 2020.

(51) Int. Cl.
G06F 9/38 (2018.01)
G06F 9/30 (2018.01)

(52) U.S. Cl.
CPC ............ *G06F 9/384* (2013.01); *G06F 9/3012* (2013.01); *G06F 9/3016* (2013.01); *G06F 9/30032* (2013.01)

(58) Field of Classification Search
None
See application file for complete search history.

(56) References Cited

U.S. PATENT DOCUMENTS

| 4,992,938 A | 2/1991 | Cocke et al. |
| 5,355,457 A | 10/1994 | Shebanow et al. |
| 5,694,564 A | 12/1997 | Alsup et al. |

(Continued)

FOREIGN PATENT DOCUMENTS

| EP | 1237072 A1 | 9/2002 |
| GB | 2545761 A | 6/2017 |

(Continued)

OTHER PUBLICATIONS

'Dynamically Reducing Pressure on the Physical Register File through Simple Register Sharing' by Tran et al., 2004 International Symposium on Performance Analysis of Systems and Software. (Year: 2004).*

(Continued)

*Primary Examiner* — Steven G Snyder
(74) *Attorney, Agent, or Firm* — Young Basile Hanlon & MacFarlane, P.C.

(57) ABSTRACT

Systems and methods are disclosed for duplicate detection for register renaming. For example, a method includes checking a map table for duplicates of a first physical register, wherein the map table stores entries that each map an architectural register of an instruction set architecture to a physical register of a microarchitecture and a duplicate is two or more architectural registers that are mapped to a same physical register; and, responsive to a duplicate of the first physical register in the map table, preventing the first physical register from being added to a free list upon retirement of an instruction that renames an architectural register that was previously mapped to the first physical register to a different physical register, wherein the free list stores entries that indicate which physical registers are available for renaming.

20 Claims, 6 Drawing Sheets

(56) References Cited

U.S. PATENT DOCUMENTS

| | | | |
|---|---|---|---|
| 5,708,837 | A | 1/1998 | Handlogten |
| 6,505,293 | B1 | 1/2003 | Jourdan et al. |
| 6,594,754 | B1 | 7/2003 | Jourdan et al. |
| 6,625,723 | B1 | 9/2003 | Jourday et al. |
| 6,772,317 | B2 | 8/2004 | Jourdan et al. |
| 7,171,541 | B1 | 1/2007 | Seki |
| 7,406,587 | B1 | 7/2008 | Zhang et al. |
| 9,311,084 | B2 | 4/2016 | Sundar et al. |
| 9,575,754 | B2 | 2/2017 | Keller et al. |
| 9,672,044 | B2 | 6/2017 | Tran |
| 10,417,001 | B2 | 9/2019 | Combs et al. |
| 10,838,729 | B1 | 11/2020 | Al-Otoom et al. |
| 11,061,677 | B1 * | 7/2021 | Seth ................. G06F 9/3863 |
| 2004/0015904 | A1 | 1/2004 | Jourdan et al. |
| 2012/0005459 | A1 | 1/2012 | Fleischman et al. |
| 2013/0275720 | A1 | 10/2013 | Keller et al. |
| 2013/0339671 | A1 | 12/2013 | Williams, III et al. |
| 2014/0040595 | A1 | 2/2014 | Tran |
| 2015/0039860 | A1 | 2/2015 | Sundar et al. |

FOREIGN PATENT DOCUMENTS

| | | | |
|---|---|---|---|
| WO | 0118645 | A1 | 3/2001 |
| WO | 2017028909 | A1 | 2/2017 |

OTHER PUBLICATIONS

'Two-Stage, Pipelined Register Renaming' by Safi et al., 2010. (Year: 2010).*

Tomasulo algorithm; Wikipedia; retrieved on Apr. 17, 2020; 8 pages; https://en.wikipedia.org/wiki/Tomasulo_algorithm.

Sima; :The Design Space of Register Renaming Techniques; IEEE Micro, Sep.-Oct. 2000; p. 70-83.

Celio; "A Highly Productive Implementation of an Out-of-Order Processor Generator"; Electrical Engineering and Computer Sciences, University of California at Berkeley; Dec. 1, 2018, 157 pages; http://www2.eecs.berkeley.edu/Pubs/TechRpts/2018/EECS-2018-151.html.

Bayko; "Great Microprocessors of the Past and PResent (V 10.0. 0)"; Retrieved on Apr. 17, 2020; 52 pages; https://www.cl.cam.ac.uk/teaching/2006/CompArch/documents/all/trends/cpu_history.html#88000.

Kessler; "The Alpha 21264 Microprocessor"; IEEE Micro, Mar.-Apr. 1999, pp. 24-36.

Sorin, et al.; "Register Renaming"; 2009 ECE 252 / CPS 220 Lecture Notes, Dynamic Scheduling I; p. 31-43.

Moudgill et al., Register Renaming and Dynamic Speculation: an Alternative Approach, copyright 1993, IEEE. (Year: 1993).

Lipasti et al., Physical Register Inlining, archived version from 2018. (Year: 2018).

Monreal et al., Dynamic Register Renaming Through Virtual-Physical Registers, archived version from 2017. (Year: 2017).

* cited by examiner

DUPLICATE DETECTION FOR REGISTER RENAMING

CROSS-REFERENCE TO RELATED APPLICATION(S)

This application is a continuation of U.S. patent application Ser. No. 16/851,941, filed on Apr. 17, 2020, which claims the benefit of U.S. Provisional Application No. 63/002,313, filed on Mar. 30, 2020, which are incorporated herein by reference in their entirety.

TECHNICAL FIELD

This disclosure relates to duplicate detection for register renaming.

BACKGROUND

Modern processors often use out-of-order execution with physical register renaming. Previous systems have used physical register renaming to remove write-after-write and write-after-read hazards by allocating a new destination register for each result produced. Some processors use register renaming to implement a zero-cycle move, i.e., move instruction that takes zero clock cycles to execute because it can be accomplished by renaming the destination register to use the same physical register as the source register, thus creating a duplicate renaming of the physical register.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
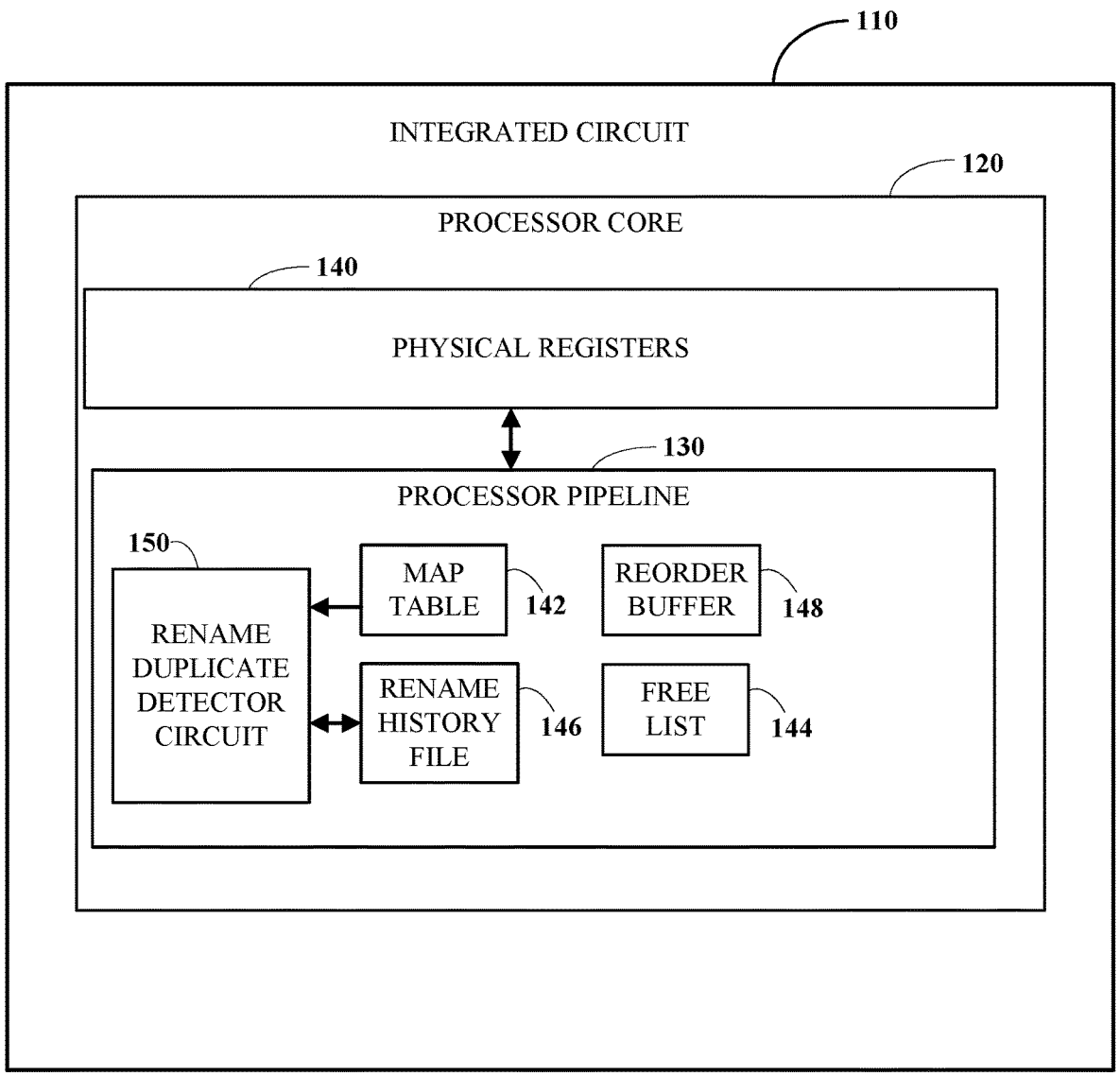
FIG. 1 is a block diagram of an example of an integrated circuit for executing instructions using duplicate detection for register renaming.

Described herein are systems and methods for duplicate detection for register renaming. In some cases, software will want to copy the value of one register into another. For example, the RISC-V instruction set architecture defines a mv rd, rs1 pseudo-instruction which translates into addi rd, rs1, 0. A microarchitecture can be configured to add a hardware feature to optimize the execution of these move instructions. Where a microarchitecture renames architectural registers to physical registers, this operation can be efficiently implemented by mapping multiple architectural registers to the same physical register. Then the mv operation is converted into a map table update, and can be treated as a no-operation (NOP) at dispatch. The map table entry for the destination architectural register may be written with an identifier (e.g., an index for a physical register that is already assigned to the source architectural register, instead of allocating a new physical register index allocated from the free list. This is referred to as "eliminating" the move, move-elimination, or a zero-cycle move.

A complication is that because there are now multiple references to the same physical register, that physical register can only be returned to the free list after all references are obsolete. Consider the following code example:
add x3, x1, x2//allocates PR 2
ld x4, 0(x3)
sub x3, x5, x4

The physical register allocated by the add (PR 2) will be returned to the free list after the sub instruction retires, because no instruction in-flight could possibly reference the result of the add. Now consider a slightly different example with move-elimination:
add x3, x1, x2//allocates PR 2
ld x4, 0(x3)
mv x6, x3//creates second reference to PR 2
sub x3, x5, x4
or x7, x6, x8
slli x6, x7, 2

Now, when the sub instruction retires, it cannot return PR 2 to the free list because the or instruction which depends on x6 will be told by the Map Table to read PR 2. Only after the slli instruction retires is it safe to return PR 2 to the free list, because x6 no longer refers to PR 2.

Many techniques for move elimination rely on some form of reference counting. A simple scheme would be to maintain reference counters per-physical register. But this is expensive as the number of physical registers scale up.

In some implementations described herein move-elimination may be supported in part by checking the map table after rename updates, rather than separately counting duplicates. For example, the map table may be checked by using a content-addressable memory circuit (CAM) to search the map table for copies of physical register identifier (e.g., index) after rename updates.

During normal rename, an instruction may write to the map table and read out the previous physical register index. The previous physical register index may be the one that is returned to the Free List when the instruction retires.

In some implementations, after a map table update occurs, the map table is checked (e.g., using a CAM circuit) for duplicates with the previous physical register index to see if any more references to that physical register remain. If no more references remain, then it is safe to return the previous physical register index to the Free List after retirement. In some implementations, each entry of a rename history file is augmented with another field (e.g., a returnToFL bit) which indicates that it is safe to return previous physical register index stored in the entry of a rename history file to the free list after retirement. It is possible that in a single cycle, multiple references to a physical register are overwritten. For example, there may checking within the map table to determine the youngest map table update that overwrote the physical register index. In some implementations only a single entry in the rename history file will attempt to return that physical register index to the free list.

During rewind, the returnToFL field is not used, since it provides information regarding on a previous physical register index, which is being inserted rather than removed from the map table during rewind. During rewind the same CAMs are used to check for duplicate references again.

In some implementations, these techniques for duplicate detection for register renaming may be used to realize one or more advantages over conventional processors. For example, the structures and techniques described herein may reduce the area of an integrated circuit supporting register renaming with duplicates (e.g., for zero-cycle moves), and/or reduce power consumption.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is a block diagram of an example of an integrated circuit 110 for executing instructions using duplicate detection for register renaming. The integrated circuit 110 includes a processor core 120. The processor core 120 includes a processor pipeline 130 and physical registers 140. The processor pipeline 130 support register renaming includes a map table 142, a free list 144, a rename history file 146, a reorder buffer 148, and a rename duplicate detector circuit 150. The integrated circuit 110 may provide advantages over conventional processor architectures, such as, for example, smaller circuit area and/or reduction of power consumption. For example, the integrated circuit 110 may implement the process 200 of FIG. 2. For example, the integrated circuit 110 may implement the process 300 and the process 350 of FIGS. 3A-3B. For example, the integrated circuit 110 may implement the process 400 of FIG. 4. For example, the integrated circuit 110 may implement the process 500 of FIG. 5.

The integrated circuit 110 includes a processor core 120 including a processor pipeline 130 configured to execute instructions with register reaming. The pipeline 130 includes a rename stage and may include additional stages, such as, fetch, decode, dispatch, issue, execute, memory access, and write-back stages. The processor core 120 includes physical registers 140. For example, the physical registers 140 may include general purpose x registers and floating-point registers. The physical registers may be used to store the values of architectural registers of an instruction set architecture. For example, the processor core 120 may configured to execute instructions of a RISC V instruction set and the physical registers 140 may be dynamically renamed to store values of RISC-V architectural registers.

The integrated circuit 110 includes a map table 142 configured to store entries that each map an architectural register of an instruction set architecture to a physical register of a microarchitecture. The map table 142 is a structure which maintains the mapping from architectural register index to the most recently allocated physical register which stores the value of that architectural register. In some implementations, are two separate map tables, one for the general-purpose x registers, and one for the floating-point f registers. There may be a special Zero physical register that is always hardwired to zero. For example, an integer physical register 0 is may be hardwired to zero, and an x register map table entry 0 will always point to this physical register 0. In some implementations, each instruction in the rename stage of the processor pipeline 130 will read the map table 142 to get the physical register indices for its two possible register sources (3 for floating point instructions), and also for its possible destination register. Instructions which have fewer register sources (e.g., instructions with immediate sources), or no destination register, may simply ignore the map table 142 output at those ports. For lower power consumption, these instructions may be detected in an instruction decode stage and the map table 142 read muxes will not be toggled. Similarly, instructions which read x registers may not read the floating-point map table 142, and vice versa.

Instructions which write to a register will update the map table 142 with the physical register index that was allocated for that instruction from the Free List 144. There may be write-to-read bypass muxes in case younger instructions depend on updates from the older instructions within the same rename stage.

After a pipeline redirect occurs (e.g., due to misspeculation or a trap is taken), the map table 142 may be recovered to a potentially earlier state. Any update made after the point of the misspeculation or trap needs to be undone. Until the recovery is complete, new instructions on the correct path may be stalled in rename. It is possible to track which map table 142 entries have been completely recovered, and avoid stalling instructions in rename which only reference recovered entries. However, in some implementations, the processor pipeline 130 may lack a mechanism to track such information, so all instructions may be stalled in rename until the entire map table 142 is recovered.

For example, this recovery may be handled by two different operations: (1) checkpoint recovery (if checkpoints are included) and (2) rewinding updates from the rename history file 146.

If checkpoints are configured as included, then after a pipeline redirect the checkpoint control logic will attempt to find a valid checkpoint to restore from. For example, the entire contents of the map table 142 may be checkpointed, so the contents of the checkpoint may be simply copied back into the main map table 142. After restoring from the checkpoint, it's likely that some amount of rewinding is still necessary, which is described below.

In some implementations, during rewind, all of the updates to the map table 142 that had taken place after the redirect point must be undone. For each update to the map table 142, the index that was updated (the architectural register index), and the value that was overwritten (the previous physical register index) may be stored in the rename history file 146. During a rewind, the rename history file 146 may supply this information for a configurable number of updates per cycle (e.g., the rewind rate), so that the map table 142 can reverse the update. The previous physical register index may be written back to the entry indexed by the architectural register index.

For example, the normal read and write ports to the map table 142 may be re-used during rewind. If the rewind rate is configured as greater than the rename rate (e.g., to provide speedier recovery), then there may be extra write ports on the map table 142 only used during rewind.

The integrated circuit 110 includes a free list 144 configured to store entries that indicate which physical registers 140 are available for renaming. The free list 144 keeps track of physical registers 140 which are currently un-mapped and free for allocation by a new instruction with a destination. For example, there are separate free lists 144 for general purpose x registers and floating-point registers. In some implementations, the free list 144 is maintained as a bitvector, where a 1 in position i indicates that physical register i is free. Note that register x0 may be handled as a special case, and may be hardwired to zero. In some implementations, Bit 0 of the free list 144 vector for the x registers will never be set to 1'b1.

There are two main operations that are performed on the free list 144: allocation of physical registers 140, and returning of physical registers 140 to the free list 144.

All instructions which write to a destination register (other than x0), may allocate a physical register 140 for the result value. For example, generating a physical register index may be done with a find-first one search on the vector, and a priority encoder. If the core is configured to rename multiple instructions per cycle (the Rename rate), then that number of find-first searches are done. For example, the first search may be done starting from the LSB of the vector, the second search may be done starting from the MSB, the third search may be done starting from the LSB (with the first search result masked out), and so on. An identifier of a physical register (e.g., a physical register index) may then be provided to update the map table 142 and passed down with the instruction's payload.

To prevent long timing paths from searching the bit vector to encoding the identifier of the physical register to updating the map table 142, the identifiers of the physical registers may be pre-allocated into allocation registers. For example, the number of allocation registers may be the same as the rename width. After reset, the first free physical registers 140 may be removed from the vector, encoded, and placed into the allocation registers. Then, when an instruction in the rename stage needs to take a physical register 140 (e.g., consume the allocation register), the load enable on the allocation registers may be set and the next free physical registers 140 may be loaded into the allocation registers. This way identifiers of the physical registers 140 (e.g., the physical register indexes) are available directly from a flop in the rename stage. In some implementations, when allocation registers are consumed, register 0 is consumed first, followed by register 1, and so on. Note that the oldest instruction in the rename stage may not need to allocate a physical register, while younger instructions may. Logic outside the map table 142 may be used to route the physical register for the "1st allocating instruction" to the younger instruction.

In some implementations, the search logic of the free list 144 does not explicitly check whether multiple searches returned the same identifier of a physical register (e.g., the same physical register index) when the free list 144 is close to empty. Instead, a counter may be used to maintain the number of 1's in the bit-vector. The allocation registers may also each have valid bits to indicate whether the identifier encoded in the register is valid (i.e., that the identified physical register is free). When a bit is cleared from the vector of the free list 144, and the encoded physical register index is loaded into the allocation register, then the counter may be decremented. When a physical register is returned to the bit vector, the counter may be incremented.

In some implementations, when filling the allocation registers, register 0 has highest priority followed by register 1, and so on. If the counter value is low enough such that there are not enough free physical registers 140 to fill the allocation registers, then the valid bits of the remaining unfilled allocation registers are set to zeros. Note that it is possible for a higher-indexed allocation register to be valid, and a lower-indexed register to be invalid. For this reason there may be a 2:1 mux on the output for the 1st allocating instruction. For a 3-wide rename configuration there may be a 3:1 mux for the 1st allocating instruction and a 2:1 mux for the 2nd allocating instruction. To illustrate how this case may happen, consider the following example sequence of events (for a 3-wide rename configuration): 1. All three allocation registers are initially valid. 2. In a given cycle, only 2 instructions need to allocate physical registers 140, so allocation registers 0 and 1 are consumed. 3. The bit-vector is empty, and the counter value==0, so allocation registers 0 and 1 are set to invalid for the next cycle. Allocation registers 2 remains valid. Eventually as physical registers 140 are returned to the free list, allocation registers 0 and 1 will become valid again.

When instructions with valid register destinations retire, the identifier of a physical register (e.g., a physical register index) that they overwrote in the map table 142 may eventually be returned to the free list 144. This identifier of a physical register may be supplied by the rename history file 146. For example, when a valid identifier of a physical register is supplied by the rename history file 146, it may be decoded back into a one-hot vector. In some implementations, multiple physical registers 140 (e.g., up to the retire rate) may be supplied per cycle. These one-hot vectors may then be OR'd together, and the resulting multi-hot vector may then be OR'd into the free list 144 bit-vector.

If the core is configured with checkpoints, then the contents of the free list 144 bitvector may be checkpointed. After a redirect, if the checkpointing logic determines that we can restore from a checkpoint, then the checkpointed copy may be restored to the main free list 144 bit-vector, and then any necessary rewinding may be done as described below. Note that when physical registers 140 are returned to the main free list 144 from normal retirement (not rewind), they may also be returned to any valid checkpoints.

During rewind, physical registers 140 that were allocated from the free list 144 by squashed instructions may be returned to the free list 144. These identifiers of physical registers 140 (e.g., physical register indexes) may be provided by the map table 142. To avoid having a large number of write ports into the free list 144, the identifiers of physical registers 140 from the map table 142 may be muxed with the identifiers of physical registers 140 from the rename history file 146 (e.g., from instruction retirement). To prevent losing physical registers 140, retirement from the rename history file 146 may be stalled during rewind so that there is no collision on these muxes.

The integrated circuit 110 includes a rename history file 146. For example, the rename history file 146 may be a FIFO structure which keeps track of all the updates to the map table 142. The rename history file 146 may provide a history of all of the physical register allocations, and which architectural register index they map to. For example, the rename history file 146 may track updates to both the x register mapping and the floating-point register mapping. The rename history file 146 may serve two main functions: to recover the map table 142 after a pipelined redirect, and to return physical registers 140 to the free list 144 after instruction retirement.

For example, the rename history file 146 may maintain two important pointers: the read pointer and the write pointer. The read pointer points to the next entry of the rename history file 146 to be retired. The write pointer points to the next entry of the rename history file 146 to be allocated by instructions in rename. When the rename history file 146 becomes full, or close to full, instructions may be stalled in rename until the necessary number of entries in the rename history file 146 become available.

For example, an entry of the rename history file 146 may include an identifier (e.g., an index) of an architectural register and an identifier (e.g., an index) of a physical register 140 that was previously mapped onto the architectural register. In some implementations, an entry of the rename history file 146 may include an indication (e.g., a flag) of whether the update is for a floating-point register or a general-purpose x register. For example, an entry of the rename history file 146 may include a status bit that indicates whether there is a duplicate of the physical register in the map table 142 and thus whether it is OK to free the physical register upon retirement of the instruction that caused the map table 142 update reflected by this entry of the rename history file 146.

For example, where the rename history file 146 is a FIFO with a relatively large number of entries, it may be advantageous to physically implement the rename history file 146 in banks to reduce the number of read and write ports on each entry. For example, the number of banks in the rename history file 146 may be greater than or equal to the dispatch width, so that only a single write port is needed per-bank. For example, the number of banks may also be greater than or equal to the retire width, so that only a single read port is needed per-bank for retirement or rewind.

For example, a dispatch interface to the rename history file 146 may include several logical write ports (the rename width). In some implementations, only instructions which write to a destination register will allocate an entry of the rename history file 146. For example, the rename history file 146 may compact out any instructions which do not allocate an entry, and then the rename history file 146 may rotate the data to the correct bank based on the current write pointer. Similarly, the read ports for retirement or rewind may read up to one entry from each bank, and then rotate the read data. During retirement, entries may be read in the direction from read to write pointer, and during rewind the entries are read in the direction from write to read pointer. In some implementations, only one set of rotation muxes is needed though because the retirement data fans out to different logic than the rewind data. The rewind datapath may be connected to different wires on the outputs of the rotation muxes.

For example, when the reorder buffer 148 entries retire, the number of entries of the rename history file 146 allocated by instructions in that group may be known. During retirement, the reorder buffer 148 may indicate the total number of entries of the rename history file 146 to be retired. The reorder buffer 148 may indicate a number that is larger than the retire rate of the rename history file 146, so the rename history file 146 may maintain a counter of the number of entries remaining to be retired. In some implementations, when this count is greater than zero, and the pipeline is not rewinding, the normal retirement process occurs.

For example, starting from the read pointer of the rename history file 146, up to a configurable number of entries (the retire rate of the rename history file 146) may be read out from the FIFO. For each of these entries, an identifier of the previous physical register indicates the physical register which should be returned to the free list 144. Normally, this is the identifier of the previous physical register, which was overwritten in the map table 142, and no younger in-flight instructions in the pipeline may reference this physical register anymore, so it is safe to return to the free list 144. The read pointer of the rename history file 146 may be incremented by the number of retiring entries (up to the retire rate), and the counter may be decremented by the same amount. However, in this example, the rename history file 146 has an additional status bit to support zero-cycle moves or move-elimination, which can create duplicates of a physical register in the map table 142 and may cause a physical register not to be immediately returned to the free list 144 when a corresponding update is retired. This feature is described further below in relation to the rename duplicate detector circuit 150.

In the event of a pipeline redirect, the rewind process may handle recovering the map table 142 and other pipeline structures to a correct state. In some implementations, the rewind process needs to complete before new instructions may be renamed, so it may be advantageous to performance that the rewind finish quickly. Because of this, after a pipeline redirect, rename history file 146 retirement may be paused, and the read ports of the rename history file 146 may be used for rewinding. When rewinding is complete, the rename history file 146 may resume retiring entries.

For example, if the core is configured with checkpoints), then the write pointer of the rename history file 146 may be checkpointed. After a redirect, if the checkpointing logic determines that recovery from a checkpoint is available, then the checkpointed write pointer is restored. This restored write pointer may then be the beginning point for rewinding as described below.

For example, during a pipeline redirect, the rename history file 146 may be provided with the index to restore the write pointer to (from a checkpointed copy or not). Starting from the current write pointer (minus 1), and working towards the flush index, entries may be read out of the rename history file 146 at a configurable rate (e.g., the rewind rate). Each entry of the rename history file 146 corresponds to an instruction which updated the map table 142 with a newly allocated physical register. In some implementations, for each of these entries, the map table 142 is looked up (e.g., using the identifier of the architectural register as an index) to retrieve an identifier of the physical register that was allocated. That same entry of the map table 142 is then overwritten with the identifier of the previous physical register that was stored in the entry of the rename history file 146, which is the previous mapping that this instruction overwrote during rename. Normally, the identifier of the physical register that was read from the map table 142 is then returned to the free list. However, in this example, the processor pipeline 130 supports zero-cycle moves or move-elimination, which can create duplicates of a physical register in the map table 142 and may cause a physical register not to be immediately returned to the free list 144 when a corresponding update is rewound. This feature is described further below in relation to the rename duplicate detector circuit 150.

In some implementations, once the write pointer of the rename history file 146 becomes equal to the flush index, the rename history file 146 signals that the rewind operation is complete. As soon as the last update to the map table 142 takes place, then any new instructions in the rename stage no longer need to be stalled, unless the rewind of the reorder buffer 148 is still taking place.

The integrated circuit 110 includes a reorder buffer 148. For example, the reorder buffer 148 may be a FIFO structure that is used to maintain the program ordering for in-flight instructions. In some implementations, the reorder buffer 148 allows for precise exception handling, and recovery of certain pipeline structures after misspeculations or traps are taken. For example, the reorder buffer 148 may track instructions from the time of dispatch, until they are executed and non-speculative and eventually retired from the processor pipeline 130 in-order.

The integrated circuit 110 includes a rename duplicate detector circuit 150 configured to check the map table 142 for duplicates of a first physical register. A duplicate is two or more architectural registers that are mapped to a same physical register. In some implementations, the rename duplicate detector circuit 150 includes a content-addressable memory circuit configured to search for instances of an identifier of a physical register in the map table 142. For example, the content-addressable memory circuit may be used to search the map table 142 for duplicates of the first physical register. For example, the rename duplicate detector circuit 150 may be configured to, responsive to a duplicate of the first physical register in the map table 142, prevent the first physical register from being added to the free list 144 upon retirement of an instruction that renames an architectural register that was previously mapped to the first physical register to a different physical register. For example, the rename duplicate detector circuit 150 may be used to detect duplicate rename mappings of physical registers with smaller circuit area and or power consumption compared to conventional methods for duplicate detection (e.g., by avoiding the use of duplicate counters for all physical registers).

The rename duplicate detector circuit 150 may be configured to detect duplicates during rewind of the map table 142. For example, the rename duplicate detector circuit 150 may be configured to, responsive to a duplicate of the first physical register in the map table 142, prevent the first physical register from being added to the free list 144 when rewinding the map table 142 by replacing an identifier of the first physical register in an entry of the map table 142 for an architectural register with an identifier of a previous physical register. For example, the identifier of the previous physical register may be retrieved from the rename history file 146 entry for the architectural register.

For example, a duplicate of the first physical register may have been generated in the map table by performing a zero-cycle move using register renaming. In some implementations, the architectural register is a first architectural register, the instruction is a first instruction, and the rename duplicate detector circuit 150 is configured to: decode a move instruction with the first architectural register as a source register and a second architectural register as a destination register; and rename to map the second architectural register to the first physical register by copying an identifier of the first physical register from the entry of the map table 142 for the first architectural register to an entry of the map table 142 for the second architectural register.

In some implementations, the map table 142 is checked for duplicates of the first physical register during renaming of the architectural register for the instruction, and the rename duplicate detector circuit 150 is configured to, responsive to a duplicate of the first physical register in the map table 142, update a status bit to indicate that there is a duplicate of the first physical register in the map table 142, wherein preventing the first physical register from being added to free list 144 upon retirement of the instruction includes checking the status bit upon retirement of the instruction. The status bit may be stored in a flip-flop or latch. The status bit may be part of the microarchitectural state of the processor core 120 and may be stored in a variety of places. For example, the status bit may be stored in an entry of the rename history file 146 that also includes an identifier of the architectural register and an identifier of the first physical register (e.g., the first physical register may be the previous physical register that is referenced in the entry of the rename history file 146 stored during rename for the instruction). For example, the status bit may serve as an indication of whether it is "OK to free" the first physical register when the instruction is retired (i.e., OK if no duplicates were detected, not OK if a duplicate was detected). In some implementations, the status bit is stored in an entry of the reorder buffer 148 that is associated with the instruction. For example, the rename duplicate detector circuit 150 may be used to implement the process 300 and the process 350 of FIGS. 3A-B.

In some implementations, the map table is checked for duplicates of the first physical register during retirement of the instruction. For example, the first physical register may be a previous physical register identified by an entry of the rename history file 146 associated with the instruction that is retrieved from the rename history file 146 at retirement of the instruction. For example, the map table 142 may then be searched (e.g., using a content-addressable memory circuit) for copies of the identifier for the previous physical register.

Figure 2:
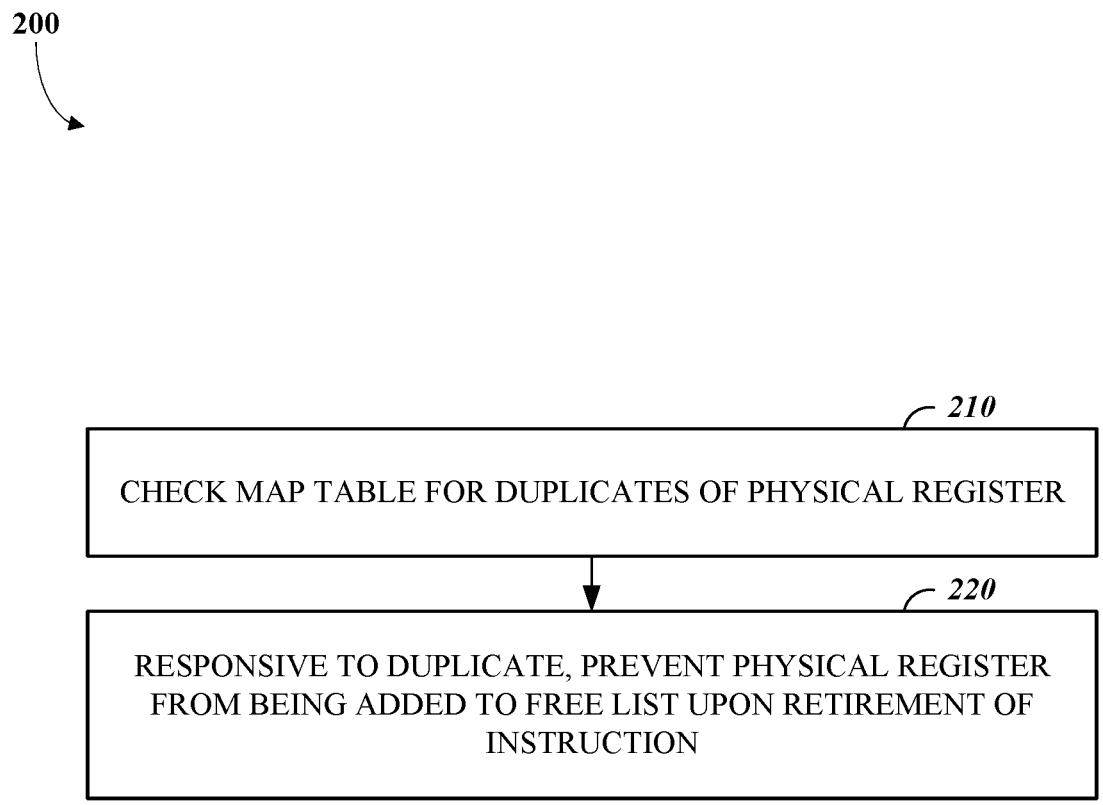
FIG. 2 is a flow chart of an example of a process for duplicate detection for register renaming.

FIG. 2 is a flow chart of an example of a process 200 for duplicate detection for register renaming. The process 200 includes checking 210 a map table for duplicates of a first physical register; and, responsive to a duplicate of the first physical register in the map table, preventing the first physical register from being added to a free list upon retirement of an instruction that renames an architectural register that was previously mapped to the first physical register to a different physical register. For example, the process 200 may be implemented using the integrated circuit 110 of FIG. 1.

The process 200 includes checking 210 a map table (e.g., the map table 142) for duplicates of a first physical register. The map table stores entries that each map an architectural register of an instruction set architecture to a physical register of a microarchitecture. A duplicate is two or more architectural registers that are mapped to a same physical register. For example, checking 210 the map table for duplicates of the first physical register may include searching for instances of an identifier (e.g., an index) of the first physical register in the map table using a content-addressable memory circuit. For example, a duplicate of the first physical register in the map table may have been generated by a zero-cycle move instruction. For example, the process 500 of FIG. 5 may have been preformed to generate the duplicate.

In some implementations, the map table is checked 210 for duplicates of the first physical register during retirement of the instruction. For example, the first physical register may be a previous physical register identified by an entry of the rename history file associated with the instruction that is retrieved from the rename history file at retirement of the instruction.

In some implementations, the map table is checked 210 for duplicates of the first physical register during renaming of the architectural register for the instruction. For example, the process 200 may include, responsive to a duplicate of the first physical register in the map table, updating a status bit to indicate that there is a duplicate of the first physical register in the map table. For example, the status bit may be stored in an entry of a rename history file (e.g., the rename history file 146) that also includes an identifier of the architectural register and an identifier of the first physical register. In some implementations, the status bit is stored in an entry of a reorder buffer (e.g., the reorder buffer 148) that is associated with the instruction. For example, the process 300 of FIG. 3A may be used during rename to check 210 for duplicates of the first physical register.

The process 200 includes, responsive to a duplicate of the first physical register in the map table, preventing 220 the first physical register from being added to a free list (e.g., the free list 144) upon retirement of an instruction that renames an architectural register that was previously mapped to the first physical register to a different physical register. The free list stores entries that indicate which physical registers are available for renaming. In some implementations, preventing 220 the first physical register from being added to the free list upon retirement of the instruction includes checking the status bit upon retirement of the instruction. For example, the process 350 of FIG. 3B may be used at retirement of the instruction to prevent 220 the first physical register from being added to the free list upon retirement of the instruction.

Figure 3A:
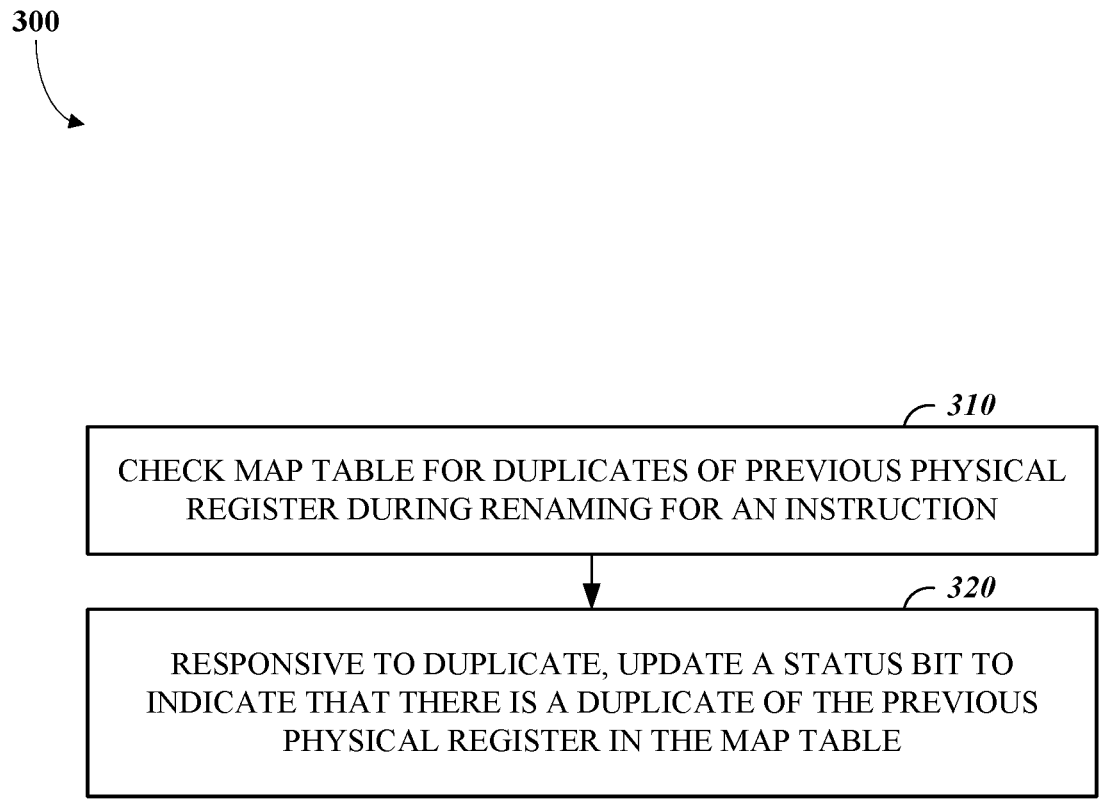
FIG. 3A is a flow chart of an example of a process for register renaming for an instruction using duplicate detection.

FIG. 3A is a flow chart of an example of a process 300 for register renaming for an instruction using duplicate detection. The process 300 includes checking 310 a map table for duplicates of a previous physical register during renaming of the architectural register for the instruction; and, responsive to a duplicate of the first physical register in the map table, updating 320 a status bit to indicate that there is a duplicate of the previous physical register in the map table. The status bit may be part of the microarchitectural state of the processor core 120 and may be stored in a variety of places. For example, the status bit may be stored in an entry of a rename history file (e.g., the rename history file 146) that also includes an identifier of the architectural register and an identifier of the previous physical register. For example, the status bit may serve as an indication of whether it is "OK to free" the previous physical register when the instruction is retired (i.e., OK if no duplicates were detected, not OK if a duplicate was detected). In some implementations, the status bit is stored in an entry of a reorder buffer (e.g., the reorder buffer 148) that is associated with the instruction. For example, the process 300 may be implemented using the integrated circuit 110 of FIG. 1.

Figure 3B:
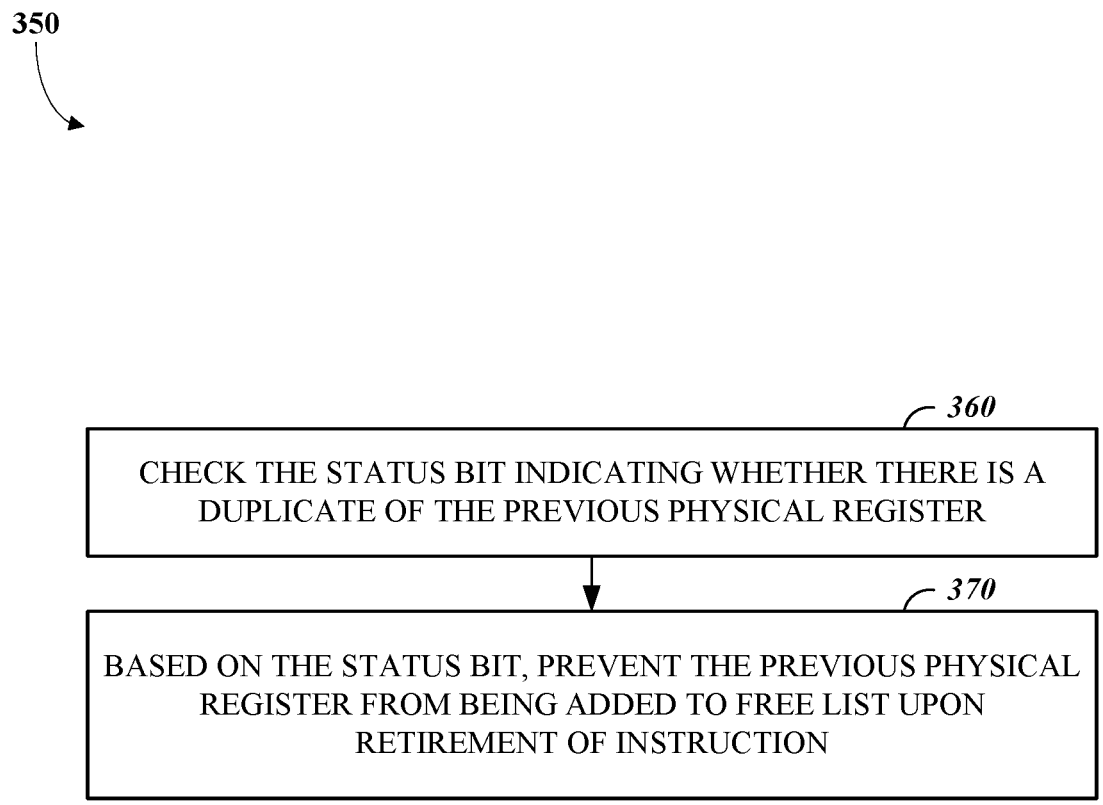
FIG. 3B is a flow chart of an example of a process for retiring an instruction after register renaming with duplicates.

FIG. 3B is a flow chart of an example of a process 350 for retiring an instruction after register renaming with duplicates. The process 350 may be performed after the process 300. For example, the process 350 may be triggered by logic of a processor pipeline (e.g., logic in the reorder buffer 148) that retires instructions. The process 350 includes checking 360 the status bit upon retirement of the instruction; and, based on the status bit, preventing 370 the previous physical register from being added to a free list (e.g., the free list 144) upon retirement of the instruction. For example, the process 300 may be implemented using the integrated circuit 110 of FIG. 1.

Figure 4:
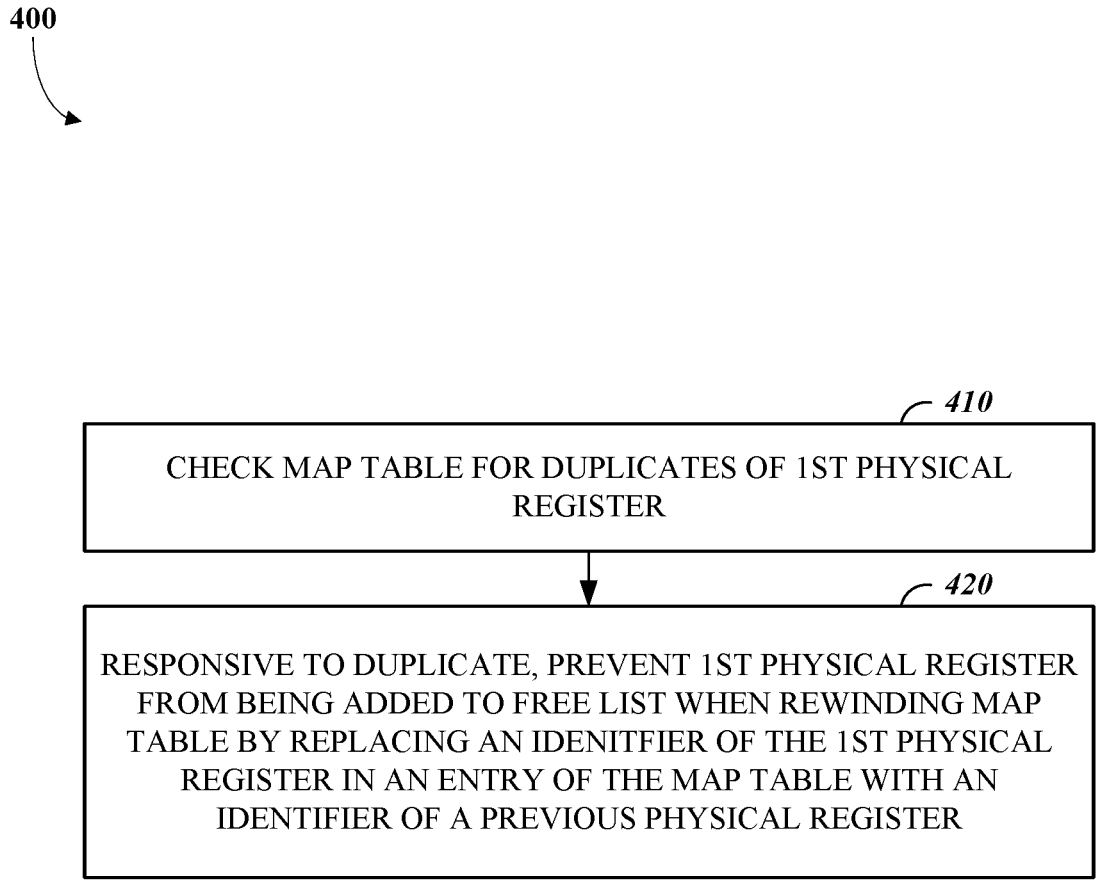
FIG. 4 is a flow chart of an example of a process for rewinding a register renaming map table after a pipeline flush or redirect using duplicate detection.

FIG. 4 is a flow chart of an example of a process 400 for rewinding a register renaming map table after a pipeline flush or redirect using duplicate detection. The process 400 includes checking 410 the map table for duplicates of a first physical register; and, responsive to a duplicate of the first physical register in the map table, preventing 420 the first physical register from being added to a free list when rewinding the map table by replacing an identifier of the first physical register in the entry of the map table for an architectural register with an identifier of a previous physical register. For example, the process 400 may be implemented using the integrated circuit 110 of FIG. 1.

The process 400 includes checking 410 the map table (e.g., the map table 142) for duplicates of a first physical register. A duplicate is two or more architectural registers that are mapped to a same physical register. For example, checking 410 the map table for duplicates of the first physical register may include searching for instances of an identifier (e.g., an index) of the first physical register in the map table using a content-addressable memory circuit. For example, a duplicate of the first physical register in the map table may have been generated by a zero-cycle move instruction. For example, the process 500 of FIG. 5 may have been performed to generate the duplicate.

The process 400 includes, responsive to a duplicate of the first physical register in the map table, preventing 420 the first physical register from being added to a free list (e.g., the free list 144) when rewinding the map table by replacing an identifier of the first physical register in an entry of the map table for an architectural register with an identifier of a previous physical register. For example, the identifier of the previous physical register may be retrieved from a rename history file entry (e.g., an entry of the rename history file 146) for the architectural register.

Figure 5:
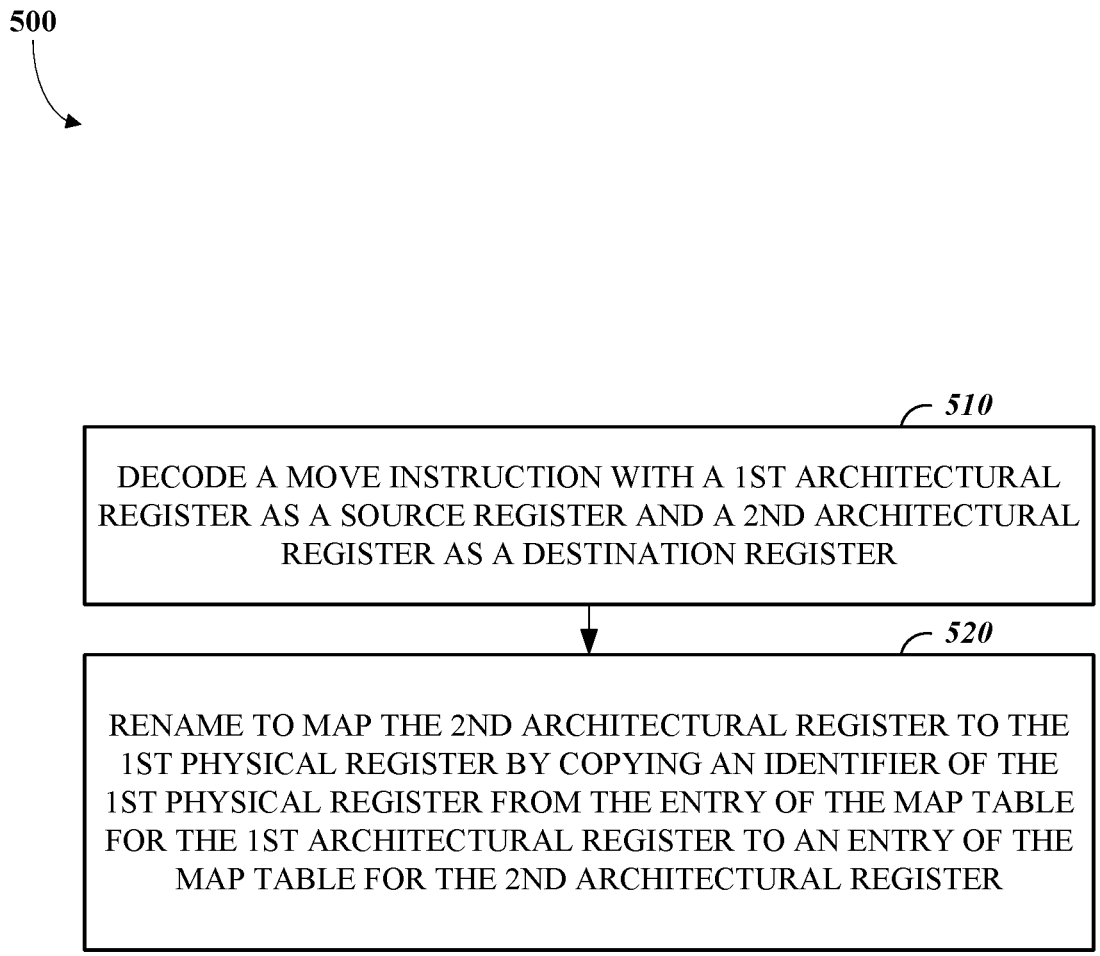
FIG. 5 is a flow chart of an example of a process for performing a zero-cycle move.

FIG. 5 is a flow chart of an example of a process 500 for performing a zero-cycle move. The process 500 includes decoding 510 a move instruction with the first architectural register as a source register and a second architectural register as a destination register; and renaming 520 to map the second architectural register to the first physical register by copying an identifier of the first physical register from the entry of the map table for the first architectural register to an entry of the map table for the second architectural register. For example, the process 500 may be implemented using the integrated circuit 110 of FIG. 1.

In a first aspect, the subject matter described in this specification can be embodied in an integrated circuit for executing instructions that includes a map table configured to store entries that each map an architectural register of an instruction set architecture to a physical register of a microarchitecture, a free list configured to store entries that indicate which physical registers are available for renaming, and a rename duplicate detector circuit configured to: check the map table for duplicates of a first physical register, wherein a duplicate is two or more architectural registers that are mapped to a same physical register; and, responsive to a duplicate of the first physical register in the map table, prevent the first physical register from being added to the free list upon retirement of an instruction that renames an architectural register that was previously mapped to the first physical register to a different physical register.

In a second aspect, the subject matter described in this specification can be embodied in methods that include checking a map table for duplicates of a first physical register, wherein the map table stores entries that each map an architectural register of an instruction set architecture to a physical register of a microarchitecture and a duplicate is two or more architectural registers that are mapped to a same physical register; and, responsive to a duplicate of the first physical register in the map table, preventing the first physical register from being added to a free list upon retirement of an instruction that renames an architectural register that was previously mapped to the first physical register to a different physical register, wherein the free list stores entries that indicate which physical registers are available for renaming.

In a third aspect, the subject matter described in this specification can be embodied in an integrated circuit for executing instructions that includes a map table configured to store entries that each map an architectural register of an instruction set architecture to a physical register of a microarchitecture, a free list configured to store entries that indicate which physical registers are available for renaming, and a rename duplicate detector circuit configured to: check the map table for duplicates of a first physical register, wherein a duplicate is two or more architectural registers that are mapped to a same physical register; and, responsive to a duplicate of the first physical register in the map table, prevent the first physical register from being added to the free list when rewinding the map table by replacing an identifier of the first physical register in an entry of the map table for an architectural register with an identifier of a previous physical register.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a map table configured to store a set of entries that each map an architectural register of an instruction set architecture to a physical register of a microarchitecture;
   a free list configured to store entries that indicate which physical registers are available for renaming; and
   a rename duplicate detector circuit configured to:
      check the set of entries in the map table for duplicates of a first physical register, wherein a duplicate is two or more architectural registers that are mapped to a same physical register; and
      responsive to a duplicate of the first physical register in the map table, prevent the first physical register from being added to the free list.

2. The integrated circuit of claim 1, in which the rename duplicate detector circuit comprises:
   a content-addressable memory circuit configured to search for instances of an identifier of a physical register in the map table.

3. The integrated circuit of claim 1, in which the map table is checked for duplicates of the first physical register during renaming of the architectural register for the instruction, and the rename duplicate detector circuit is configured to:
   responsive to a duplicate of the first physical register in the map table, update a status bit to indicate that there is a duplicate of the first physical register in the map table, wherein preventing the first physical register from being added to free list includes checking the status bit upon retirement of the instruction.

4. The integrated circuit of claim 3, in which the status bit is stored in an entry of a rename history file that also includes an identifier of the architectural register and an identifier of the first physical register.

5. The integrated circuit of claim 3, in which the status bit is stored in an entry of a reorder buffer that is associated with the instruction.

6. The integrated circuit of claim 1, in which the map table is checked for duplicates of the first physical register during retirement of the instruction.

7. The integrated circuit of claim 1, in which the architectural register is a first architectural register, the instruction is a first instruction, and the rename duplicate detector circuit is configured to:
   decode a move instruction with the first architectural register as a source register and a second architectural register as a destination register; and
   rename to map the second architectural register to the first physical register by copying an identifier of the first physical register from the entry of the map table for the first architectural register to an entry of the map table for the second architectural register.

8. A method comprising:
   checking a set of entries in a map table for duplicates of a first physical register, wherein the map table stores the set of entries that each map an architectural register of an instruction set architecture to a physical register of a microarchitecture and a duplicate is two or more architectural registers that are mapped to a same physical register; and
   responsive to a duplicate of the first physical register in the map table, preventing the first physical register from being added to a free list, wherein the free list stores entries that indicate which physical registers are available for renaming.

9. The method of claim 8, in which checking the map table for duplicates of the first physical register comprises:
   searching for instances of an identifier of the first physical register in the map table using a content-addressable memory circuit.

10. The method of claim 8, in which the map table is checked for duplicates of the first physical register during renaming of the architectural register for the instruction, and comprising:
    responsive to a duplicate of the first physical register in the map table, updating a status bit to indicate that there is a duplicate of the first physical register in the map table, wherein preventing the first physical register from being added to the free list includes checking the status bit upon retirement of the instruction.

11. The method of claim 10, in which the status bit is stored in an entry of a rename history file that also includes an identifier of the architectural register and an identifier of the first physical register.

12. The method of claim 10, in which the status bit is stored in an entry of a reorder buffer that is associated with the instruction.

13. The method of claim 8, in which the map table is checked for duplicates of the first physical register during retirement of the instruction.

14. The method of claim 8, in which the architectural register is a first architectural register, the instruction is a first instruction, and comprising:
    decoding a move instruction with the first architectural register as a source register and a second architectural register as a destination register; and
    renaming to map the second architectural register to the first physical register by copying an identifier of the first physical register from the entry of the map table for the first architectural register to an entry of the map table for the second architectural register.

15. A method comprising:
    checking a set of entries in a map table for duplicates of a first physical register, wherein the map table stores the set of entries that each map an architectural register of an instruction set architecture to a physical register of a microarchitecture and a duplicate is two or more architectural registers that are mapped to a same physical register; and
    responsive to a duplicate of the first physical register in the map table, preventing the first physical register from being added to a free list when rewinding the map table by replacing an identifier of the first physical register in an entry of the map table for an architectural register with an identifier of a previous physical register, wherein the free list stores entries that indicate which physical registers are available for renaming.

16. The method of claim 15, in which the identifier of the previous physical register is retrieved from a rename history file entry for the architectural register.

17. The method of claim 15, in which checking the map table for duplicates of the first physical register comprises:
searching for instances of an identifier of the first physical register in the map table using a content-addressable memory circuit.

18. The method of claim 15, in which the map table is checked for duplicates of the first physical register during renaming of the architectural register for the instruction, and comprising:
responsive to a duplicate of the first physical register in the map table, updating a status bit to indicate that there is a duplicate of the first physical register in the map table, wherein preventing the first physical register from being added to the free list includes checking the status bit when rewinding the map table.

19. The method of claim 18, in which the status bit is stored in an entry of a rename history file that also includes an identifier of the architectural register and an identifier of the first physical register.

20. The method of claim 15, in which the architectural register is a first architectural register, the instruction is a first instruction, and comprising:
decoding a move instruction with the first architectural register as a source register and a second architectural register as a destination register; and
renaming to map the second architectural register to the first physical register by copying an identifier of the first physical register from the entry of the map table for the first architectural register to an entry of the map table for the second architectural register.

* * * * *